(12) United States Patent
Changali et al.

(10) Patent No.: US 8,054,591 B2
(45) Date of Patent: Nov. 8, 2011

(54) ARC DETECTION USING DISCRETE WAVELET TRANSFORMS

(75) Inventors: Sriram Changali, Cochin (IN); John Kenneth Hooker, Louisville, KY (US); Konstantin Vladimir Grigoryan, Louisville, KY (US); Scott Jeffrey Hall, Louisville, KY (US)

(73) Assignee: General Electric Company, Schenectady, NY (US)

( * ) Notice: Subject to any disclaimer, the term of this patent is extended or adjusted under 35 U.S.C. 154(b) by 538 days.

(21) Appl. No.: 12/179,114

(22) Filed: Jul. 24, 2008

(65) Prior Publication Data
US 2010/0020451 A1 Jan. 28, 2010

(51) Int. Cl.
*H02H 3/00* (2006.01)
*H01H 73/00* (2006.01)

(52) U.S. Cl. .......................................... 361/42; 361/115
(58) Field of Classification Search .................... 361/42, 361/115
See application file for complete search history.

(56) References Cited

U.S. PATENT DOCUMENTS

| | | |
|---|---|---|
| 4,514,709 A | 4/1985 | Nakano et al. |
| 5,185,684 A | 2/1993 | Beihoff et al. |
| 5,185,685 A | 2/1993 | Tennies et al. |
| 5,185,686 A | 2/1993 | Hansen et al. |
| 5,185,687 A | 2/1993 | Beihoff et al. |
| 5,208,542 A | 5/1993 | Tennies et al. |
| 5,223,795 A | 6/1993 | Blades |
| 5,434,509 A | 7/1995 | Blades |
| 5,452,223 A | 9/1995 | Zuercher et al. |
| 5,485,093 A | 1/1996 | Russell et al. |
| 5,506,789 A | 4/1996 | Russell et al. |
| 5,512,832 A | 4/1996 | Russell et al. |
| 5,550,751 A | 8/1996 | Russell |
| 5,561,605 A | 10/1996 | Zuercher et al. |
| 5,578,931 A | 11/1996 | Russell et al. |
| 5,600,526 A | 2/1997 | Russell et al. |
| 5,659,453 A | 8/1997 | Russell et al. |
| 5,682,101 A | 10/1997 | Brooks et al. |
| 5,691,869 A | 11/1997 | Engel et al. |
| 5,726,577 A | 3/1998 | Engel et al. |
| 5,729,145 A | 3/1998 | Blades |
| 5,805,397 A | 9/1998 | MacKenzie |
| 5,815,352 A | 9/1998 | MacKenzie |

(Continued)

FOREIGN PATENT DOCUMENTS

EP 1329733 B1 5/2006

(Continued)

OTHER PUBLICATIONS

Leung; "Predictive Maintenance of Circuit Breakers"; University of Waterloo, Waterloo, Ontario, Canada, 2007.

(Continued)

*Primary Examiner* — Jared Fureman
*Assistant Examiner* — Scott Bauer
(74) *Attorney, Agent, or Firm* — Cantor Colburn LLP (57) ABSTRACT

An apparatus to perform series and parallel arc fault current interruption (AFCI). The apparatus includes a resistive element configured to sense a load from which a current signal is generated, a first detection unit configured to output a first signal based on the current signal, and a microcontroller configured to decompose at least the first signal via discrete wavelet transforms to thereby obtain discrete wavelet coefficients, and to generate a trip signal when the discrete wavelet coefficients indicate that a threshold condition for trip signal generation are satisfied.

18 Claims, 7 Drawing Sheets

U.S. PATENT DOCUMENTS

| | | | |
|---|---|---|---|
| 5,835,321 A | 11/1998 | Elms et al. | |
| 5,839,092 A | 11/1998 | Erger et al. | |
| 5,933,305 A | 8/1999 | Schmalz et al. | |
| 5,969,920 A | 10/1999 | MacKenzie | |
| 5,982,593 A | 11/1999 | Kimblin et al. | |
| 5,986,860 A | 11/1999 | Scott | |
| 6,031,699 A | 2/2000 | Dollar, II et al. | |
| 6,052,046 A | 4/2000 | Ennis et al. | |
| 6,128,170 A | 10/2000 | Daum | |
| 6,137,418 A * | 10/2000 | Zuercher et al. | 340/648 |
| 6,191,589 B1 | 2/2001 | Clunn | |
| 6,195,241 B1 | 2/2001 | Brooks et al. | |
| 6,198,611 B1 | 3/2001 | MacBeth | |
| 6,232,857 B1 | 5/2001 | Mason, Jr. et al. | |
| 6,239,962 B1 | 5/2001 | Seymour et al. | |
| 6,255,923 B1 | 7/2001 | Mason, Jr. et al. | |
| 6,259,996 B1 | 7/2001 | Haun et al. | |
| D450,660 S | 11/2001 | Seymour et al. | |
| 6,313,642 B1 | 11/2001 | Brooks | |
| 6,362,628 B2 | 3/2002 | MacBeth et al. | |
| 6,373,257 B1 | 4/2002 | MacBeth et al. | |
| 6,377,055 B1 | 4/2002 | MacBeth | |
| 6,388,849 B1 | 5/2002 | Rae | |
| 6,414,829 B1 | 7/2002 | Haun | |
| 6,417,671 B1 | 7/2002 | Tiemann | |
| 6,426,632 B1 | 7/2002 | Clunn | |
| 6,459,273 B1 | 10/2002 | Dollar, II et al. | |
| 6,504,692 B1 | 1/2003 | MacBeth et al. | |
| 6,522,228 B2 | 2/2003 | Wellner et al. | |
| 6,522,509 B1 | 2/2003 | Engel et al. | |
| 6,532,139 B2 | 3/2003 | Kim et al. | |
| 6,538,863 B1 | 3/2003 | MacBeth | |
| 6,542,056 B2 | 4/2003 | Nerstrom et al. | |
| 6,545,574 B1 | 4/2003 | Seymour et al. | |
| 6,556,397 B2 | 4/2003 | Kim et al. | |
| 6,570,392 B2 | 5/2003 | MacBeth et al. | |
| 6,590,754 B1 | 7/2003 | MacBeth | |
| 6,608,741 B1 | 8/2003 | MacBeth | |
| 6,621,669 B1 | 9/2003 | Haun et al. | |
| 6,625,550 B1 | 9/2003 | Scott et al. | |
| 6,628,487 B1 | 9/2003 | MacBeth | |
| 6,633,467 B2 | 10/2003 | MacBeth et al. | |
| 6,642,832 B2 | 11/2003 | Pellon et al. | |
| 6,654,219 B1 | 11/2003 | Romano et al. | |
| 6,678,137 B1 | 1/2004 | Mason, Jr. et al. | |
| 6,703,842 B2 | 3/2004 | Itimura et al. | |
| 6,707,651 B2 | 3/2004 | Elms et al. | |
| 6,720,872 B1 | 4/2004 | Engel et al. | |
| 6,777,953 B2 | 8/2004 | Blades | |
| 6,791,315 B2 * | 9/2004 | Skerritt et al. | 324/126 |
| 6,798,628 B1 | 9/2004 | MacBeth | |
| 6,833,713 B2 | 12/2004 | Schoepf et al. | |
| 6,839,208 B2 | 1/2005 | MacBeth et al. | |
| 6,876,203 B2 | 4/2005 | Blades | |
| 6,882,158 B2 | 4/2005 | Blades | |
| 6,927,579 B2 | 8/2005 | Blades | |
| 6,927,597 B2 | 8/2005 | Kliman et al. | |
| 6,972,937 B1 | 12/2005 | MacBeth et al. | |
| 6,980,407 B2 | 12/2005 | Kawate et al. | |
| 6,999,289 B2 | 2/2006 | MacBeth et al. | |
| 7,009,406 B2 | 3/2006 | Naidu et al. | |
| 7,062,388 B2 | 6/2006 | Rivers et al. | |
| 7,069,116 B2 | 6/2006 | Kunsman et al. | |
| 7,106,069 B2 | 9/2006 | Kim et al. | |
| 7,136,265 B2 | 11/2006 | Wong et al. | |
| 7,148,696 B2 | 12/2006 | Zhou et al. | |
| 7,151,656 B2 | 12/2006 | Dvorak et al. | |
| 7,205,772 B2 | 4/2007 | Naidu et al. | |
| 7,253,637 B2 | 8/2007 | Dvorak et al. | |
| 7,359,168 B2 | 4/2008 | Elms et al. | |
| 7,362,553 B2 | 4/2008 | Elms et al. | |
| 7,391,218 B2 | 6/2008 | Kojori et al. | |
| 7,403,129 B2 | 7/2008 | Zhou et al. | |
| 7,409,303 B2 | 8/2008 | Yeo et al. | |
| 7,463,465 B2 | 12/2008 | Rivers, Jr. et al. | |
| 2001/0033469 A1 | 10/2001 | MacBeth et al. | |
| 2001/0036047 A1 | 11/2001 | MacBath et al. | |
| 2002/0033701 A1 | 3/2002 | MacBath et al. | |
| 2002/0038199 A1 | 3/2002 | Blemel | |
| 2002/0051546 A1 | 5/2002 | Bizjak | |
| 2002/0080003 A1 | 6/2002 | Pellon et al. | |
| 2002/0085327 A1 | 7/2002 | Kim et al. | |
| 2002/0097056 A1 | 7/2002 | Blades | |
| 2002/0130668 A1 | 9/2002 | Blades | |
| 2002/0196031 A1 | 12/2002 | Blades | |
| 2003/0072113 A1 | 4/2003 | Wong et al. | |
| 2003/0074148 A1 | 4/2003 | Dvorak et al. | |
| 2003/0098982 A1 | 5/2003 | McLeod et al. | |
| 2003/0201780 A1 | 10/2003 | Blades | |
| 2003/0205460 A1 | 11/2003 | Buda | |
| 2004/0043255 A1 | 3/2004 | Horai et al. | |
| 2004/0095695 A1 | 5/2004 | Kim et al. | |
| 2004/0100274 A1 | 5/2004 | Gloster et al. | |
| 2004/0150410 A1 | 8/2004 | Schoeqf et al. | |
| 2004/0172207 A1 | 9/2004 | Hancock et al. | |
| 2004/0182697 A1 | 9/2004 | Buda | |
| 2005/0207083 A1 | 9/2005 | Rivers et al. | |
| 2005/0264962 A1 | 12/2005 | Kim et al. | |
| 2006/0015703 A1 | 1/2006 | Ramchandran et al. | |
| 2006/0164097 A1 | 7/2006 | Zhou et al. | |
| 2006/0203401 A1 | 9/2006 | Kojori et al. | |
| 2006/0214670 A1 | 9/2006 | Naidu et al. | |
| 2006/0279883 A1 | 12/2006 | Elms et al. | |
| 2007/0057678 A1 | 3/2007 | Dvorak et al. | |
| 2007/0086124 A1 | 4/2007 | Elms et al. | |
| 2007/0260346 A1 | 11/2007 | Ganesan et al. | |
| 2007/0263329 A1 | 11/2007 | Zhou et al. | |
| 2008/0204949 A1 * | 8/2008 | Zhou et al. | 361/42 |
| 2008/0238404 A1 | 10/2008 | Ferguson | |
| 2009/0040666 A1 * | 2/2009 | Elms et al. | 361/42 |
| 2009/0088988 A1 | 4/2009 | Muthu-Mannivannan et al. | |

FOREIGN PATENT DOCUMENTS

| | | |
|---|---|---|
| EP | 1657559 A1 | 5/2006 |
| GB | 2381607 A | 5/2003 |
| WO | 9422031 A1 | 9/1994 |
| WO | 9635250 A1 | 11/1996 |
| WO | 2007035488 A2 | 3/2007 |
| WO | 2007035488 A3 | 3/2007 |

OTHER PUBLICATIONS

Sedighi et al.; "High impedance fault detection based on wavelet transform and statistical pattern recognition"; IEEE Transactions on Power Delivery, vol. 20, Issue 4, Oct. 2005; pp. 2414-2421.

Sultan et al.; "Detection of high impedance arcing faults using a multi-layer perceptron"; IEEE Transaction on Power Delivery, vol. 7, Issue 4, 1992; pp. 1871-1877.

Al-Dabbagh et al.; "Improved microprocessor based distribution feeder earth fault protection using pattern recognition"; Proceedings of the Fourth International Conference on Development in Power Protection 1989; pp. 172-176.

Elkalashy; "Modeling and Detection of High Impedance Arcing Fault in Medium Voltage Networks"; TKK Dissertations 95, Espoo 2007.

Kadiver et al.; "An Adaptive Auto Reclosure Scheme using Wavelet Transform"; University of Tehran, Tehran, Iran.

Lai et al.; "Wavelet Transform Based Relay Algorithm for the Detection of Stochastic High Impedance Faults"; International Conference on Power Systems Transients—IPST 2003 in New Orleans, USA.

Leung; "Predictive Maintenance of Circuit Breakers"; University of Waterloo, Waterloo, Ontario, Canada.

Sedighi et al.; "High impedance fault detection based on wavelet transform and statistical pattern recognition"; IEEE Transactions on Power Delivery, vol. 20, Issue 4, Oct. 2005; pp. 2414-2421.

Sultan et al.; "Detection of high impedance arcing faults using a multi-layer perceptron"; IEEE Transaction on Power Delivery, vol. 7, Issue 4, 1992; pp. 1871-1877.

Cristan et al.; "Multitaper Power Spectrum Estimation and Thresholding: Wavelet Packets Versus Wavelets"; IEEE Transactions on Signal Processing, vol. 50, No. 12, Dec. 2002; pp. 2976-2986.

Wen-Jun Li et al.; "Arc Fault Detection Based on Wavelet Packet"; Proceedings of the Fourth International Conference onMachine Learning and Cybernetics, Guangzhou, Aug. 18-21, 2005; 0-7803-9091-01/05; 2005 IEEE; pp. 1783-1788.

* cited by examiner

FIG. 6

ARC DETECTION USING DISCRETE WAVELET TRANSFORMS

BACKGROUND OF THE INVENTION

Aspects of the present invention are directed to electrical systems and, more particularly, to methods and systems for parallel and series arc detection in electrical systems.

BRIEF DESCRIPTION OF THE BACKGROUND

Electrical systems in residential, commercial, and industrial applications usually include a panel board for receiving electrical power from a utility source. The power is routed through the panel board to one or more current interrupters such as, but not limited to circuit breakers, trip units, and others.

Each current interrupter distributes the power to a designated branch, where each branch supplies one or more loads with the power. The current interrupters are configured to interrupt the power to the particular branch if certain power conditions in that branch reach a predetermined set point.

For example, some current interrupters can interrupt power due to a ground fault, and are commonly known as ground fault current interrupters (GFCIs). The ground fault condition results when an imbalance of current flows between a line conductor and a neutral conductor, which could be caused by a leakage current or an arcing fault to ground.

Other current interrupters can interrupt power due to an arcing fault, and are commonly known as arc fault current interrupters (AFCIs). Arcing faults are defined into two main categories, series arcs and parallel arcs. Series arcs can occur, for example, when current passes across a gap in a single conductor. Parallel arcs, on the other hand, can occur when current passes between two conductors. Unfortunately, arcing faults may not cause a conventional circuit interrupter to trip. This is particularly true when a series arc occurs because the current sensing device is unable to distinguish between a series arc and a normal load current.

SUMMARY OF THE INVENTION

In accordance with an aspect of the invention, an apparatus to perform series and parallel arc fault current interruption (AFCI) is provided and includes a resistive element configured to sense a load from which a current signal is generated, a first detection unit configured to output a first signal based on the current signal, and a microcontroller configured to decompose at least the first signal via discrete wavelet transforms to thereby obtain discrete wavelet coefficients, and to generate a trip signal when the discrete wavelet coefficients indicate that a threshold condition for trip signal generation are satisfied.

In accordance with another aspect of the invention, a method of performing series and parallel arc fault current interruption (AFCI) is provided and includes sensing a load current, sampling a signal based on the sensed load current at a high frequency, when the high frequency sampling is complete and, if a zero cross is determined to have been sampled, computing zero cross discrete wavelet coefficients, when the high frequency sampling is complete and, if the zero cross is determined to have not been sampled, computing non-zero cross discrete wavelet coefficients, and issuing a trip signal if a threshold criterion is determined to have been met based on the zero and non-zero cross discrete wavelet coefficients.

In accordance with another aspect of the invention, a method of operating a current interrupter by detecting series and parallel arcs is provided and includes sensing a load current and generating a current signal therefrom, low frequency filtering the current signal and determining a fundamental frequency and a zero-cross of the low frequency filtered current signal under different load conditions, medium and/or high frequency filtering the current signal and decomposing the medium and/or the high frequency filtered current signal to predetermined levels to obtain discrete wavelet coefficients, sampling the medium and/or the high frequency filtered current signal across the zero-cross and across a predetermined non zero-cross region, computing absolute values of the discrete wavelet coefficients for the sampled medium and/or the sampled high frequency current signal at the zero-cross and the non zero-cross thereof, and summing respective energies of the computed absolute values of the discrete wavelet coefficients and issuing a trip decision based on the summed respective energies.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTIONS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
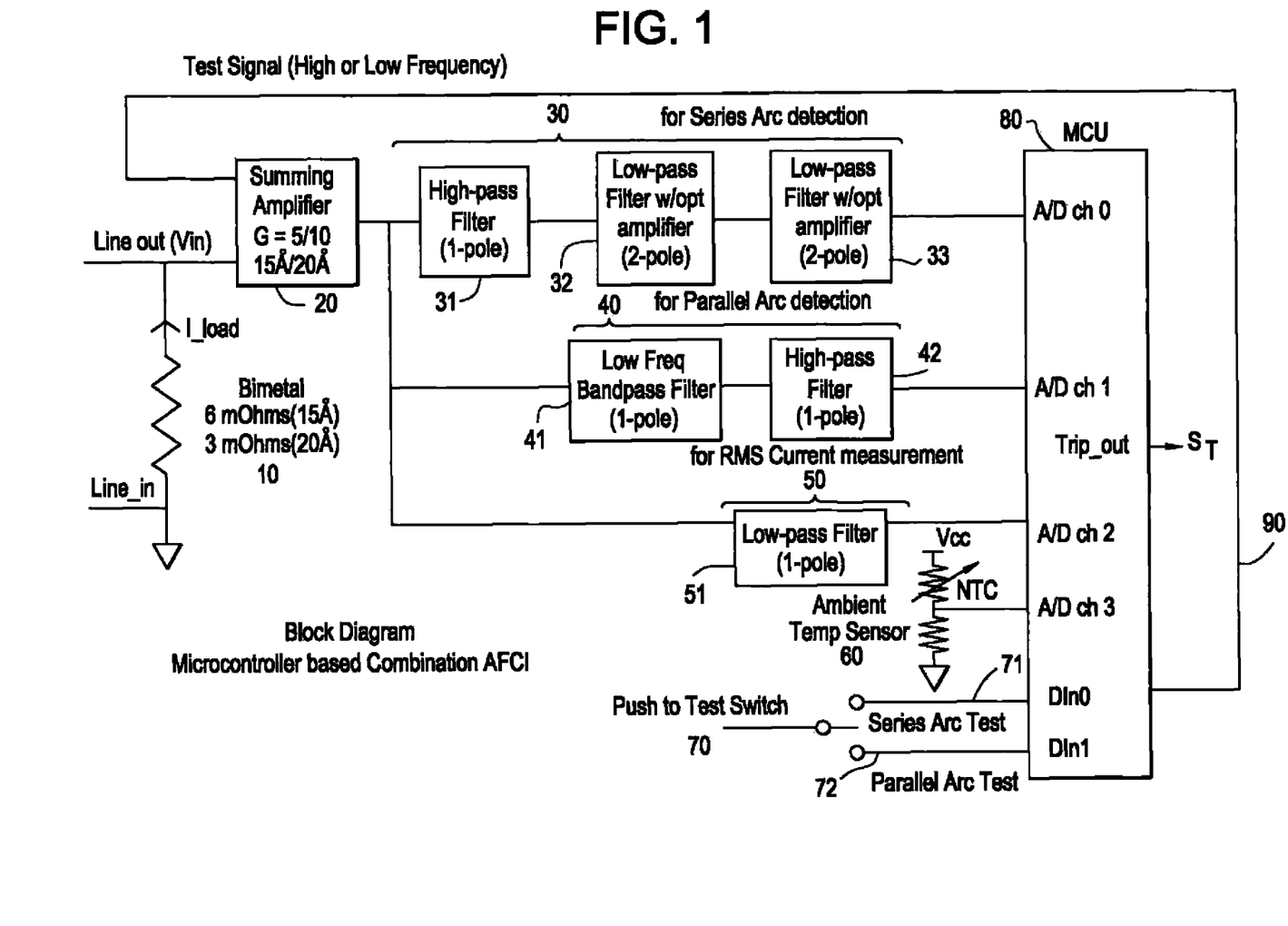
FIG. 1 is a schematic diagram of a microcontroller based combination arc fault current interrupter.

With reference to FIG. 1, an apparatus to perform series and parallel arc fault current interruption (AFCI) is provided and includes a resistive element 10, such as a bimetal, which is configured to sense a load from which a current signal is generated. The resistive element 10 may be formed of resistive materials that have a characteristic resistance at room temperature of 6 mOhms (milli-ohms) (at 15A) or 3 mOhms (at 20A). The resistive element 10 is electrically coupled to a signal line along which a summing amplifier 20 is disposed. The current signal, therefore, flows from the resistive element 10 and to the summing amplifier 20 along with a test signal 90 that may be outputted by a microcontroller 80, which will be described later.

While embodiments of the invention are disclosed having a bimetal as an example resistive element, it will be appreciated that the scope of the invention is not so limited and also encompasses other resistive elements suitable for the purposes disclosed herein, such as, for example, brass, bronze, copper alloy, steel, stainless steel, inconel steel and/or carbon-steel alloys.

The signal line is coupled to a series arc detection unit 30, a parallel arc detection unit 40 and a current measurement unit 50, such as a root mean square current measurement unit, a p-p current measurement unit, a Hall effect current sensor or any other suitable device. The series arc detection unit 30 is configured to output a first signal to the microcontroller 80 for use in detecting a series arc in the current signal and the parallel arc detection unit 40 is configured to output a second signal to the microcontroller 80 for use in detecting a parallel arc in the current signal. The current measurement unit 50 is configured to output a third signal to the microcontroller 80 for use in the performance of, e.g., RMS current measurement and arc detection sample timing.

In the present context, series and parallel arcs refer to electric breakdowns of a normally nonconductive media, such as air, that produce luminous electrical discharges, such as sparks, which result from current flowing through the normally nonconductive media. Series arcs occur in series with the load current where, as an example, a current carrying line is broken. As such, series arc current can be no higher than the load current. Conversely, parallel arcs occur between oppositely charged conductors, such as a circuit and a grounded element, and may be characterized by high current spikes and little or no load impedance.

The series arc detection unit 30 operates at a sampling rate of 300 kHz and filters all but those sub-signals having frequencies of about 6 kHz-60 Hz from the current signal. To this end, the series arc detection unit 30 includes a high pass filter 31 and, optionally, first and/or second low pass filters 32 and 33 in series with one another. Here, each of the low pass filters may include an amplifier. The parallel arc detection unit 40 operates at a sampling rate of 10 kHz and filters all but those sub-signals having frequencies of about 150-900 Hz from the current signal. To this end, the parallel arc detection unit 40 includes a low pass filter 41 and a high pass filter 42. The current measurement unit 50 operates at a sampling rate of 10 kHz and includes a low pass filter 51.

The microcontroller 80 is configured to decompose at least one of the first and second signals as received from the series arc detection unit 30 and the parallel arc detection unit 40. The decomposition is accomplished via discrete wavelet transforms DWTs, such as mother wavelets, that are obtained from external computations and at least partly from information contained within the third signal as received from the current measurement unit 50. A result of the decomposition is the computation of discrete wavelet coefficients which are themselves employed by the microcontroller 80 in the issuance of a trip signal $S_T$. That is, the microcontroller 80 is configured to generate a trip signal $S_T$ when the discrete wavelet coefficients indicate that one or more threshold conditions for trip signal $S_T$ generation are satisfied. Here, the threshold condition refers to a signal measurement that indicates that either a parallel or series arc occurs.

In accordance with embodiments of the invention, each DWT is a short wave of finite length that integrates to zero over its period of existence. The discrete wavelet coefficients are obtained from each DWT as shown in FIG. 6.

Figure 6:
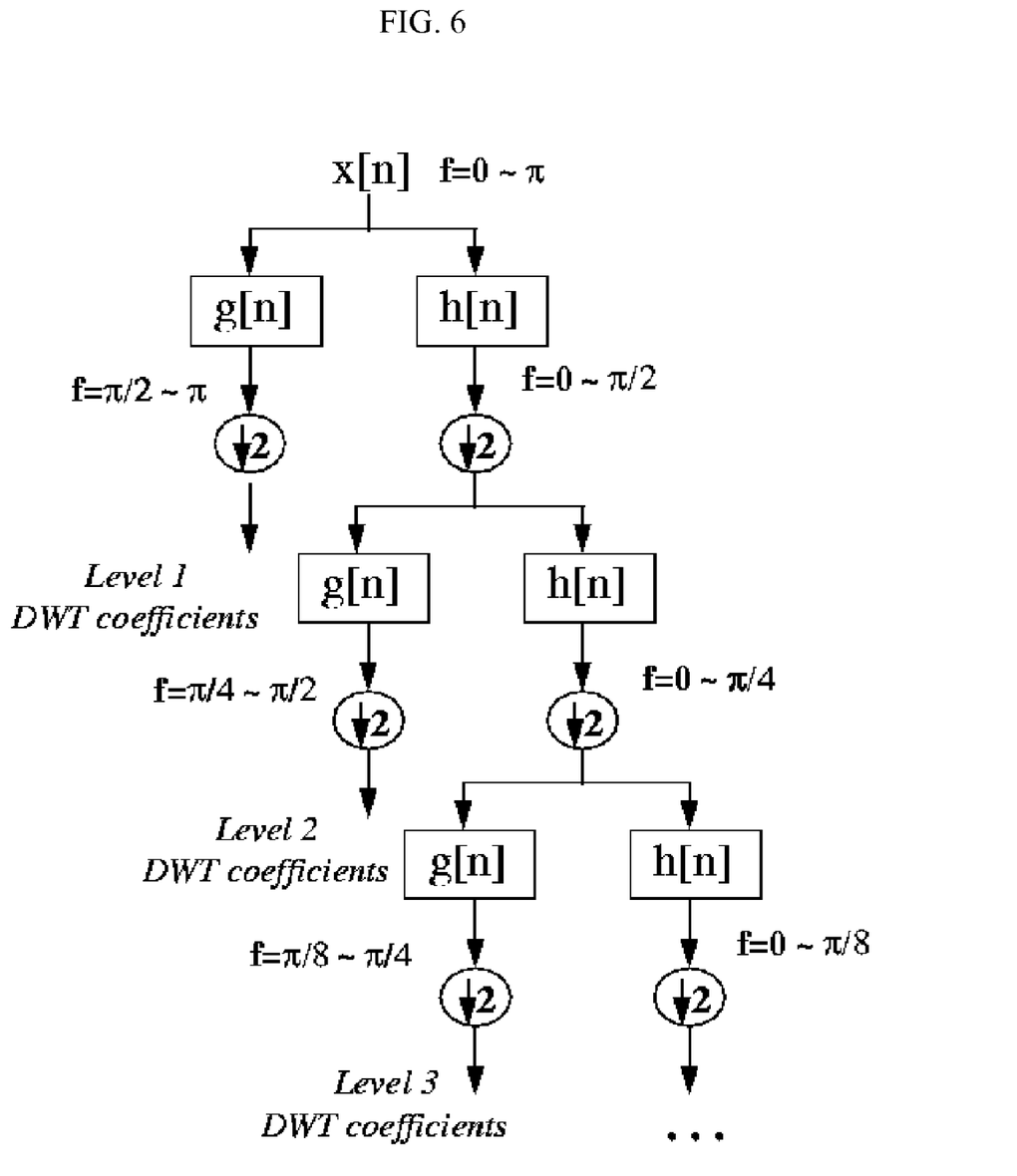
FIG. 6 illustrates a derivation of discrete wavelet coefficients from each DWT.

With reference to FIG. 6, x[n]=an input signal, g[n]=a high pass digital filter from a mother wavelet, and h[n]=a low pass digital filter from the mother wavelet.

Use of the DWTs to obtain the discrete wavelet coefficients provides several advantages in current signal analysis as compared to other analytical tools, such as Fourier transforms (FT) and Fast Fourier Transforms (FFT). For example, DWTs provide a measure of a correlation between the mother wavelet and the current signal. In addition, DWTs can inform as to what time a particular frequency occurred, are simpler to calculate and allow for a detection of an extinguish/re-strike event, which is characteristic to parallel and series arcs, by also allowing for a search for particular frequencies/patterns at zero cross moments.

Thus, when the microcontroller 80 applies DWTs to either a series arc detection or a parallel arc detection operation, the microcontroller 80 may operate by identifying a pattern or a signature that can be associated with the arcing, selecting a predetermined mother wavelet that gives a close correlation to that pattern or signature, selecting a frequency range to analyze the arcing that provides an optimized signal-to-noise ratio, selecting a portion of the waveform as the focus area and selecting the required window size that corresponds to the selected portion of the waveform.

With this in mind, it has been seen that the "Daubechies10" or "db10" mother wavelet is highly suitable for arc detection where the frequency range is set at 93 kHz or more, the sampling frequency is set at 300 kHz and no anti-aliasing filter is applied. Since it has also been seen that indicators of arcing lie at the zero cross points of the current signal, the zero cross points determine when sampling is triggered. Thus, a window size for the sampling frequency of 300 kHz is set as 25.3 degrees such that at least one of either the re-strike or extinguish events of an arc will be caught within the window.

Still referring to FIG. 1, the apparatus may further include an ambient temperature sensor 60 that is coupled to the microcontroller 80. The ambient temperature sensor 60 measures the ambient temperature of, at least, the resistive element 10 and outputs the measurement to the microcontroller 80. The microcontroller 80 then determines whether to compensate for any temperature changes of the resistive element 10 in the calculations mentioned above.

In addition, the apparatus may further include a push to test switch 70 including a series arc test configuration 71 and a parallel arc test configuration 72. The push to test switch 70 is coupled to the microcontroller 80 and allows an operator to test the apparatus upon installation in accordance with local and non-local regulations.

Figure 2:
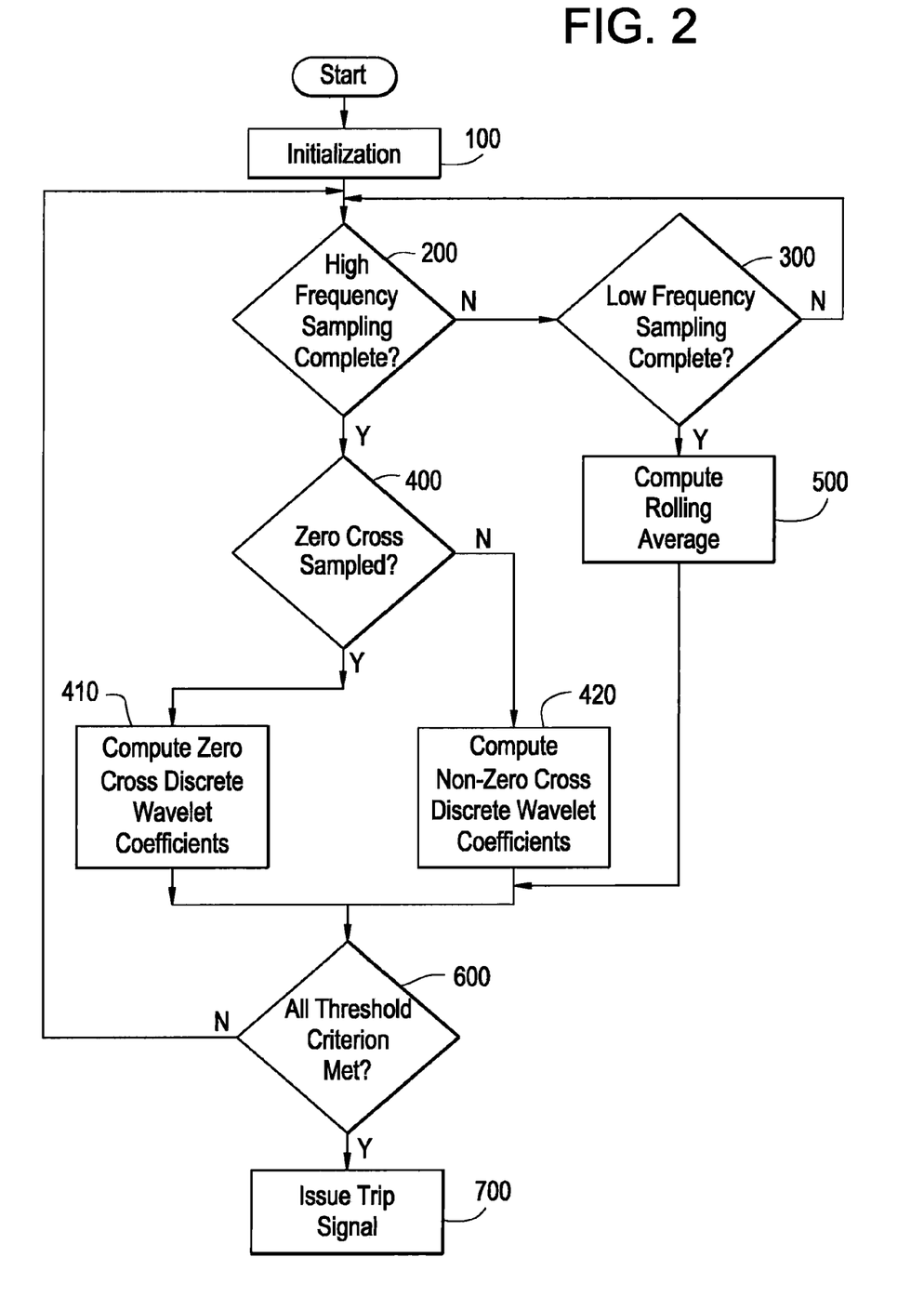
FIG. 2 is a flow diagram of a trip signal issuing algorithm.

With reference now to FIGS. 2-5, a method of performing series and parallel arc fault current interruption (AFCI) will be described. As shown in FIG. 2, upon initialization of the algorithm (operation 100), which then runs continuously, during which sensing of a load current occurs, a determination is made as to whether high frequency sampling is complete or not (operation 200). Here, the high frequency sampling actually refers to medium frequency sampling relating to the performance of the series arc detection unit 30 and the high frequency sampling relating to the performance of the parallel arc detection unit 40.

Figure 3:
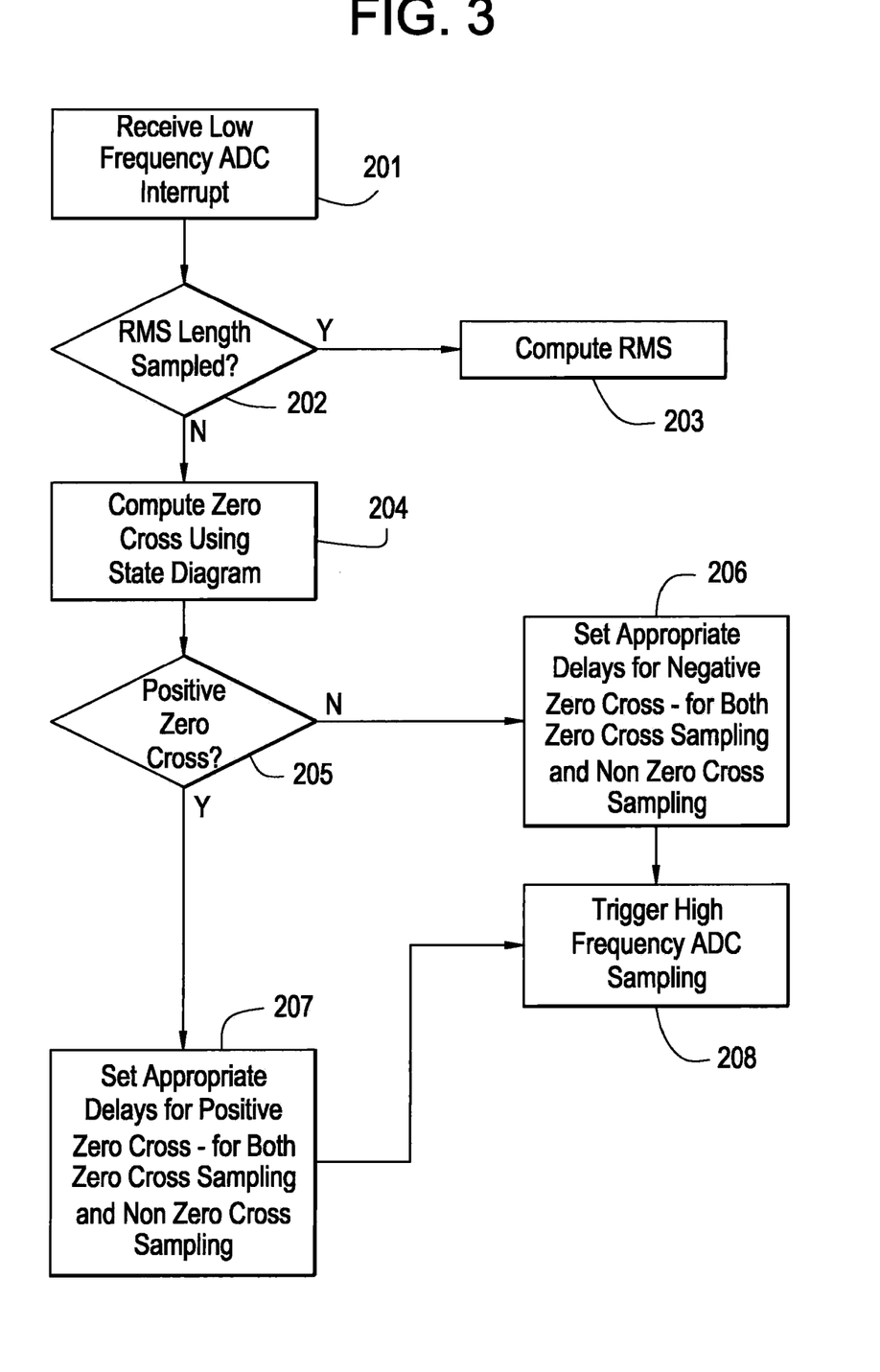
FIG. 3 is a flow diagram illustrating an interrupt handling algorithm.

Further, the high and/or medium frequency sampling occurs in accordance with the interrupt handling algorithm of FIG. 3. This algorithm starts with the receiving of a low frequency interrupt signal (operation 201), which is generated by the microcontroller 80. At this point, it is determined whether the RMS length has been sampled (operation 202) and, if it has been sampled, the RMS is computed (operation 203). Once the RMS is computed, it is used to determine how fast the apparatus needs to trip in the presence of an arcing condition. If the RMS has not yet been sampled, the zero cross is computed (operation 204).

Figure 4A:
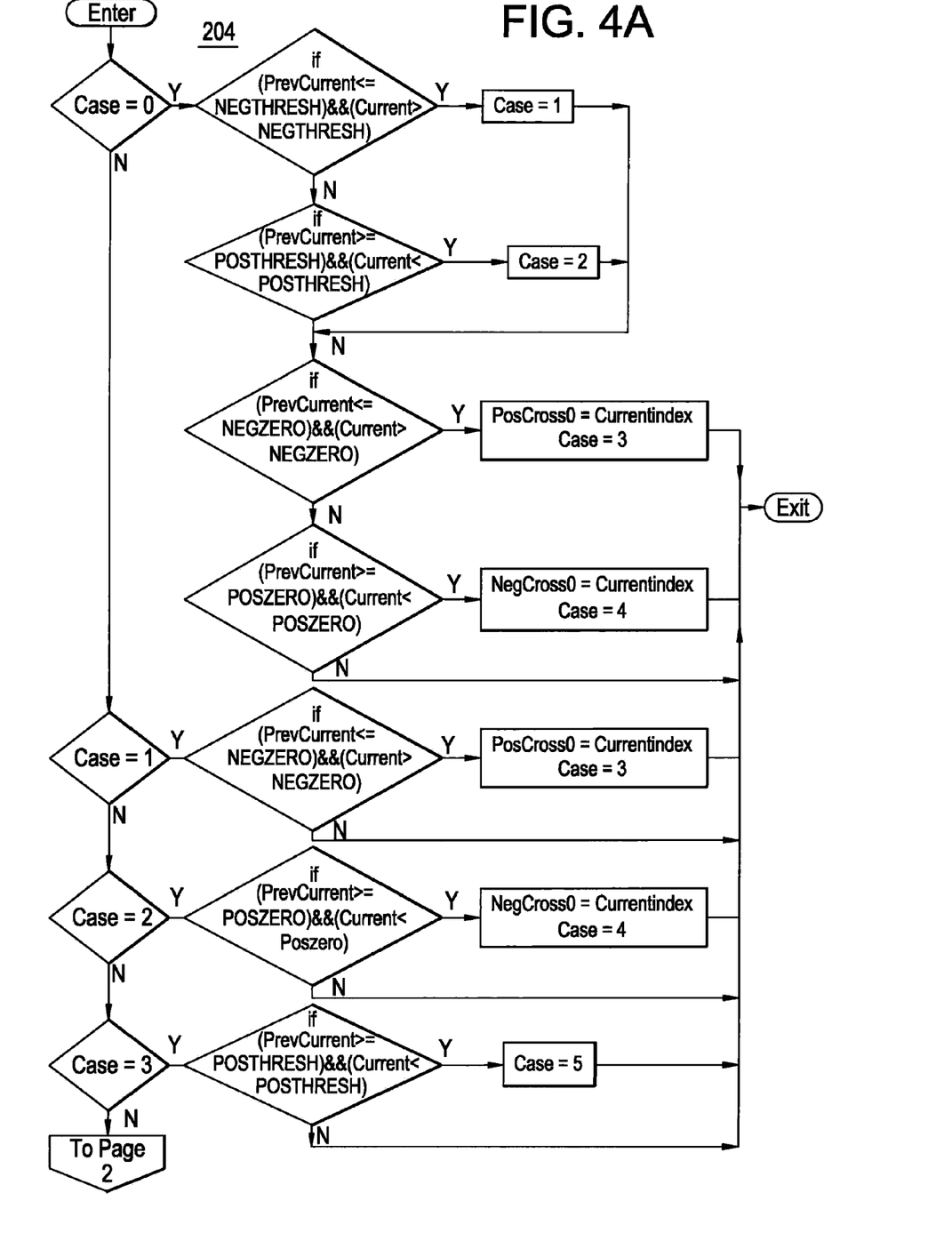
FIGS. 4A and 4B are flow diagrams illustrating zero cross computations.
Figure 4B:
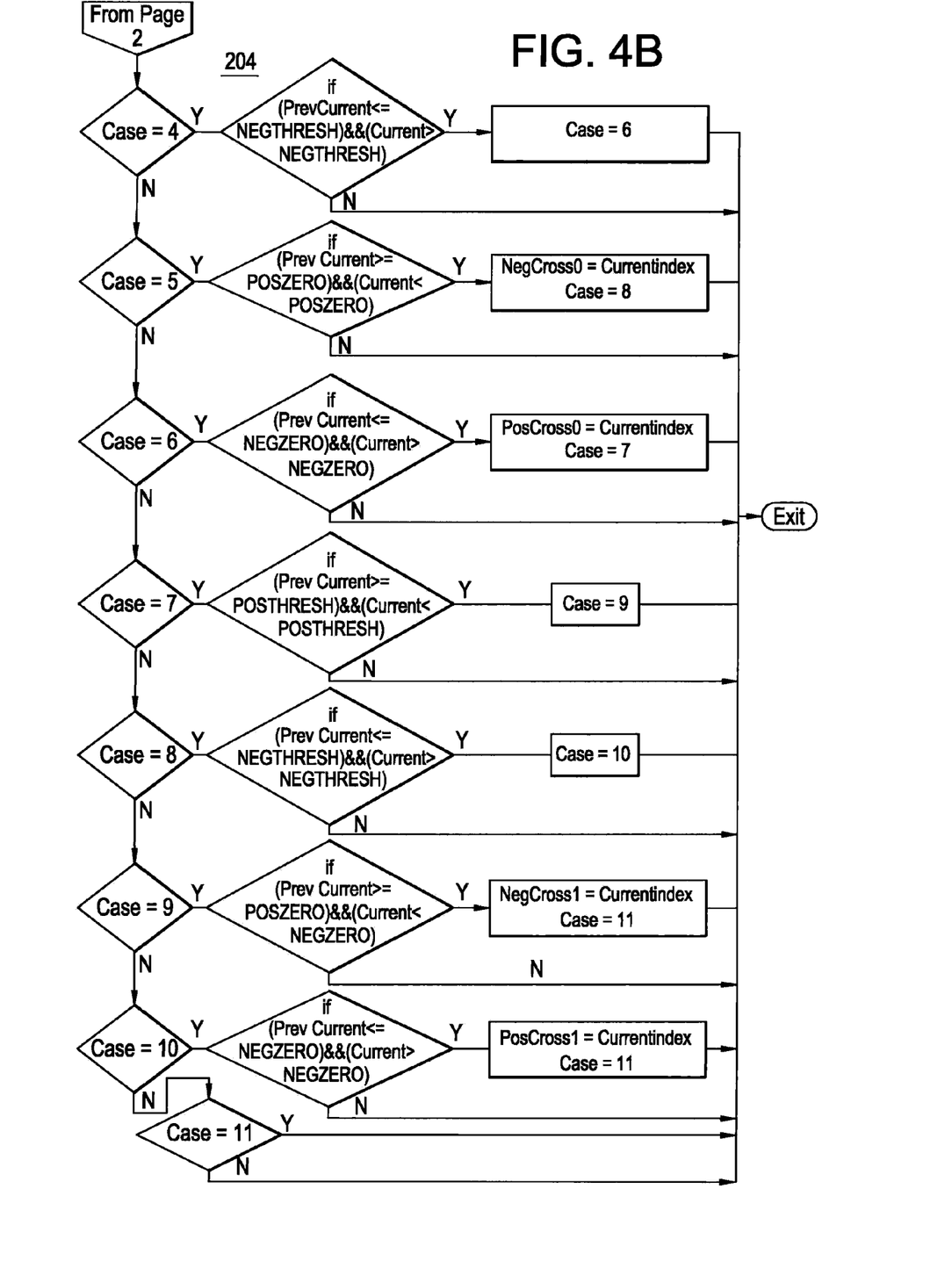

The zero cross computations of operation 204 may be conducted in accordance with the flow diagrams of FIGS. 4A and 4B. As shown, the zero cross computations refer to Cases 0-11 that each describe an if-then-else scenario related to a previous value of the current signal, where NEGTHRESH=31 15, POSTHRESH=15, NEGZERO=−3 and POSZERO=3.

Once the zero cross is computed, whether a positive zero cross has been registered is determined (operation 205). If the positive zero cross has not been registered, delays for negative zero cross for use in zero cross sampling and non zero cross sampling are set, and the medium and/or the high frequency sampling is triggered (operation 206). If, however, the positive zero cross has been registered, delays for positive zero cross are set for use in zero cross sampling and non zero cross sampling, the medium and/or the high frequency sampling is triggered (operation 207).

Referring back to FIG. 2, if the medium and/or the high frequency sampling is determined to not be complete, the current signal is sampled at a low frequency (operation 300) and, if the low frequency sampling is complete, a rolling average of the low frequency filtered signal is computed (operation 500).

If the medium and/or the high frequency sampling is completed and if a zero cross is determined to have been sampled, the zero cross discrete wavelet coefficients are computed from at least the rolling average (operation 410). Conversely, if the medium and/or the high frequency sampling is complete and if the zero cross is determined to have not been sampled, the non-zero cross discrete wavelet coefficients are computed from at least the rolling average (operation 420).

Figure 5:
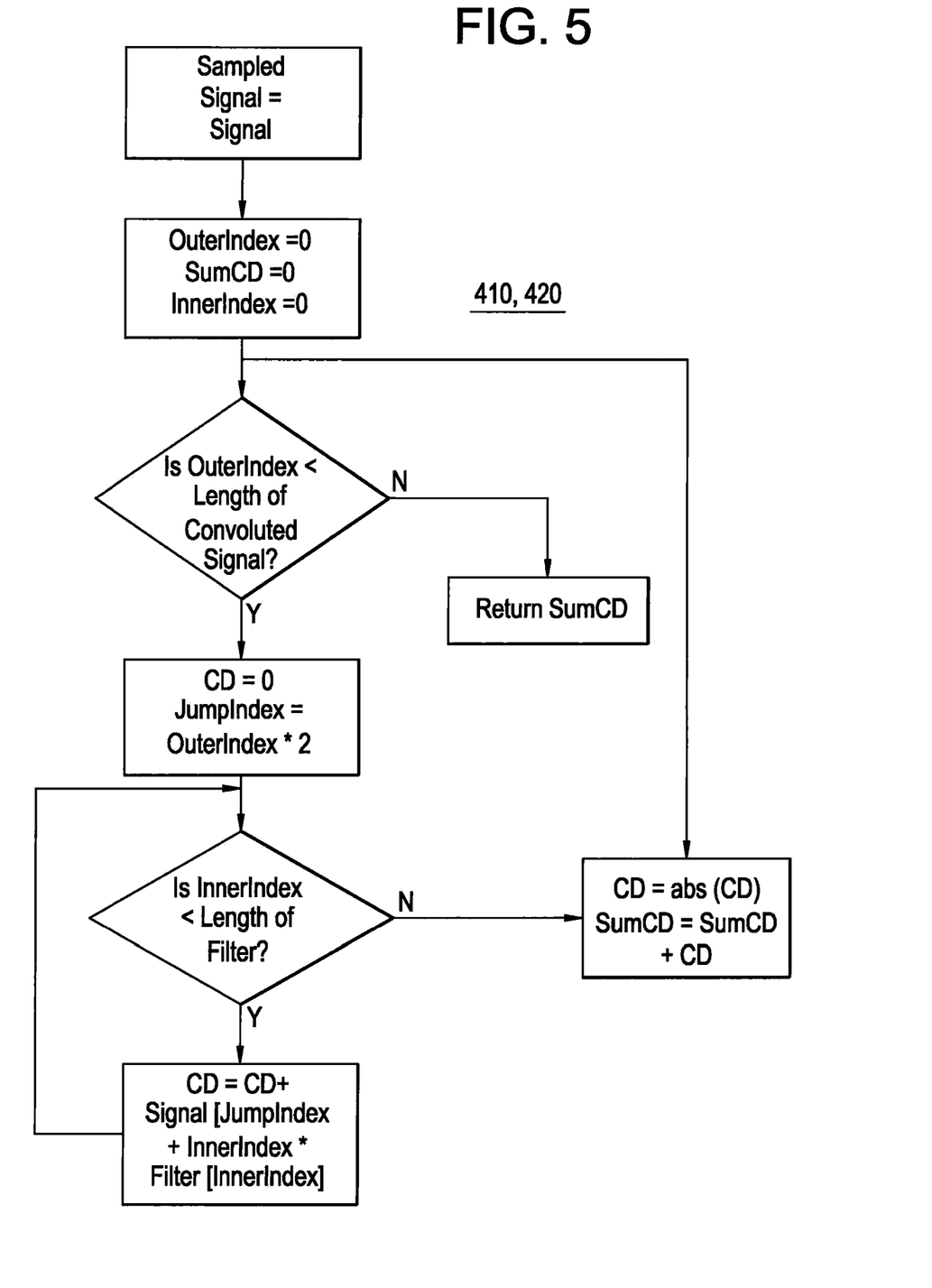
FIG. 5 is a flow diagram illustrating discrete wavelet coefficient computing algorithms.

Here, with reference to FIG. 5, the discrete wavelet algorithm is employed in operations 410 and 420. As shown, the sampled signal is initially defined as a signal with the OuterIndex, which refers to an index for the convoluted signal, the SumCD, which is the absolute value of the sum of detailed coefficients, and the InnerIndex, which is an index of a filter in use, each being set to zero.

First, whether the OuterIndex is less than a length of the convoluted signal is determined. If the OuterIndex is not less than a length of the convoluted signal, a value of the SumCD is returned to zero. Conversely, if the OuterIndex is less than a length of the convoluted signal, values of the CDs, which are the individual detailed coefficients, are set to zero and a value of a JumpIndex is set to a value of the convoluted signal multiplied by two.

Then, whether the InnerIndex is less than a length of the filter is determined. If the InnerIndex is less than a length of the filter, the values of the CDs are set to the values of the CDs added to a value of the signal. Here, the signal value is a value of the JumpIndex added to a value of the InnerIndex multiplied by a value of the filter. This process is repeated until the InnerIndex is determined to not be less than a length of the filter. At this point, the values of the CDs are set to the absolute values of the CDs and the value of the SumCD is set to the absolute value of the SumCD added to the values of the CDs.

Lastly, with reference to FIG. 2, it is determined whether all threshold criteria have been met (operation 600) based on the zero and non-zero cross discrete wavelet coefficients. Subsequently, a trip signal is issued (operation 700) if all threshold criteria are determined to have been met. Here, the issuing of the trip signal includes comparing the summed respective energies of the discrete wavelet coefficients with threshold conditions, and determining whether the summed respective energies exceed the threshold conditions for trip signal issuance.

In accordance with another aspect of the invention, a method of operating a current interrupter by detecting series and parallel arcs is provided. The method includes sensing a load current and generating a current signal therefrom, low frequency filtering the current signal and determining a fundamental frequency and a zero-cross of the low frequency filtered current signal under different load conditions, medium and/or high frequency filtering the current signal and decomposing the medium and/or the high frequency filtered current signal to predetermined levels to obtain discrete wavelet coefficients, sampling the medium and/or the high frequency filtered current signal across the zero-cross and across a pre-determined non zero-cross region, computing absolute values of the discrete wavelet coefficients for the sampled medium and/or the sampled high frequency current signal at the zero-cross and the non zero-cross thereof, and summing respective energies of the computed absolute values of the discrete wavelet coefficients and issuing a trip decision based on the summed respective energies.

Here, the decomposing operation includes decomposing the medium and/or the high frequency filtered current signal using discrete wavelet transforms obtained from the low frequency filtered current signal. Further, the issuing of the trip decision includes comparing the summed respective energies of the discrete wavelet coefficients with threshold conditions, and determining whether the summed respective energies exceed the threshold conditions for trip signal issuance.

In accordance with additional aspects of the invention, a method for determining the location of the high frequency sampling window based on the previous current zero-cross and a method of incorporating a downsampling and/or a subsampling of the input signal within the convolution to reduce a number of multiplication and addition operation in a convolution calculation are provided. Here, with reference to FIG. 5, the method includes an operation of the discrete wavelet algorithm as described above.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. An apparatus to perform series and parallel arc fault current interruption (AFCI), the apparatus comprising:
   a current sensing device configured to sense an electrical load current, the current sensing device being further configured to produce an output signal representative of the electrical load current;
   a first detection unit configured to output a first signal based on the output signal; and
   a microcontroller configured to decompose at least the first signal via discrete wavelet transforms to thereby obtain discrete wavelet coefficients by which parallel and series arc are identified, and to generate a trip signal when the discrete wavelet coefficients indicate that a threshold condition for trip signal generation is satisfied.

2. The apparatus according to claim 1, further comprising a second detection unit disposed in parallel with the first detection unit and configured to output a second signal based on the output current signal.

3. The apparatus according to claim 1, further comprising a current measurement unit disposed in parallel with the first detection unit and configured to output a measurement signal, which is based on the output current signal, such that the threshold condition for trip signal generation are is a function of the current measurement.

4. The apparatus according to claim 2, further comprising a current measurement unit disposed in parallel with the first and second detection units and configured to output a measurement signal, which is based on the output current signal, such that the threshold condition for trip signal generation is a function of the current measurement.

5. The apparatus according to claim 1, further comprising a summing amplifier operably disposed between the resistive element and the first detection unit, wherein the microcontroller is coupled to the summing amplifier.

6. The apparatus according to claim 1, further comprising an ambient temperature sensor coupled to the microcontroller by which the microcontroller determines whether to compensate for temperature changes of the resistive element.

7. The apparatus according to claim 1, wherein the first detection unit operates at a sampling rate of 300 kHz and filters all but those sub-signals having frequencies of about 6 kHz-60 Hz from the output current signal.

8. The apparatus according to claim 7, wherein the first detection unit comprises a series arc detection unit and includes a set of filters in series.

9. The apparatus according to claim 2, wherein the second detection unit operates at a sampling rate of 10 kHz and filters all but those sub-signals having frequencies of about 150-900 Hz from the output current signal.

10. The apparatus according to claim 9, wherein the second detection unit comprises a parallel arc detection unit and includes a set of filters in series.

11. The apparatus according to claim 3, wherein the current measurement unit operates at a sampling rate of 10 kHz.

12. The apparatus according to claim 6, further comprising a test switch coupled to the microcontroller in electric parallel with the ambient temperature sensor for permitting selective testing of the apparatus, the test switch including a series arc test configuration and a parallel arc test configuration.

13. An apparatus to perform series and parallel arc fault current interruption (AFCI), the apparatus comprising:
   a resistive element configured to sense a load from which a current signal is generated;
   a series arc detection unit configured to output a series arc detection signal based on the current signal;
   a parallel arc detection unit electrically disposed in parallel with the series arc detection unit and configured to output a parallel arc detection signal based on the current signal;
   a microcontroller configured to decompose the series arc and parallel arc detection signals via discrete wavelet transforms to thereby obtain discrete wavelet coefficients, and to generate a trip signal when the discrete wavelet coefficients indicate that a threshold condition for trip signal generation is satisfied.

14. The apparatus according to claim 13, further comprising a current measurement unit electrically disposed in parallel with the series arc and parallel arc detection units and configured to output a measurement signal, which is based on the current signal, such that the threshold condition for trip signal generation is a function of the current measurement.

15. The apparatus according to claim 14, wherein the series arc detection unit comprises a high pass filter and two low pass filters in electric series, the parallel arc detection unit comprises a low frequency bandpass filter and a high pass filter in electric series and the current measurement unit comprises a low pass filter.

16. The apparatus according to claim 14, further comprising a summing amplifier operably disposed between the resistive element and the series arc and parallel arc detection units and the current measurement unit, wherein the microcontroller is coupled to the summing amplifier.

17. The apparatus according to claim 13, further comprising an ambient temperature sensor coupled to the microcontroller by which the microcontroller determines whether to compensate for temperature changes of the resistive element.

18. The apparatus according to claim 17, further comprising a test switch coupled to the microcontroller in electric parallel with the ambient temperature sensor for permitting selective testing of the apparatus, the test switch including a series arc test configuration and a parallel arc test configuration.

* * * * *